E. G. CARR.
BAIL.
APPLICATION FILED APR. 7, 1919.
1,347,891. Patented July 27, 1920.
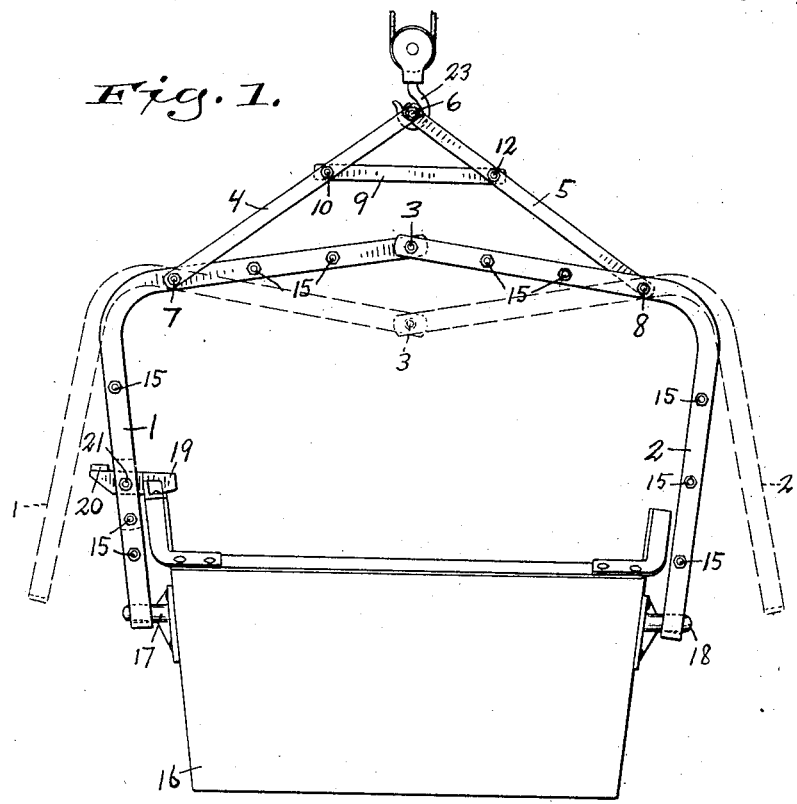
Fig. 1.
Fig. 2.
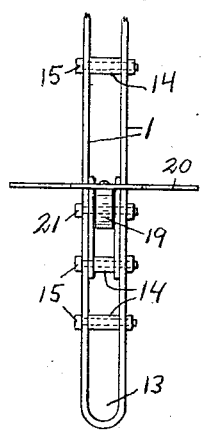
Fig. 3.
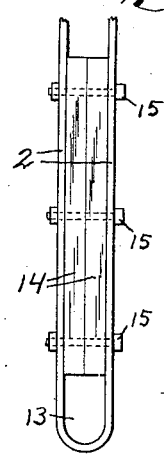
Fig. 4.
Fig. 5.
Inventor
Edward G. Carr
By Bottum, Bottum, Hudnall & Lecher
Attorneys.

UNITED STATES PATENT OFFICE.

EDWARD G. CARR, OF MILWAUKEE, WISCONSIN, ASSIGNOR TO THE LAKEWOOD ENGINEERING COMPANY, OF CLEVELAND, OHIO, A CORPORATION OF OHIO.

BAIL.

1,347,891.  Specification of Letters Patent.  Patented July 27, 1920.

Application filed April 7, 1919. Serial No. 288,065.

*To all whom it may concern:*

Be it known that I, EDWARD G. CARR, a citizen of the United States, residing at Milwaukee, in the county of Milwaukee and State of Wisconsin, have invented certain new and useful Improvements in Bails, of which the following is a specification, reference being had to the accompanying drawings, forming a part thereof.

This invention relates to bails and the object of the invention is to improve the construction of bails in the manner to be hereinafter described and claimed.

Referring to the drawings which accompany this specification and form a part hereof, which drawings illustrate an embodiment of this invention, and on which drawings the same reference characters are used to designate the same parts wherever they may appear in each of the several views. Figure 1 is an elevation of a bail connected with a receptacle; Fig. 2 is a plan view of the bail shown by Fig. 1; and Figs. 3, 4 and 5 are elevations of details of construction of the bail illustrated by the drawings.

The object of the invention is to provide a bail which can be readily attached to or detached from a receptacle and which, while attached to a receptacle, will be a rigid bail which cannot be detached except when purposely manipulated for that purpose.

Referring to the drawings, the reference numerals 1 and 2 designate bail arms which are pivotally connected by a pivot 3. Each bail arm is bent approximately at right angles as clearly shown by Fig. 1 of the drawings to extend up from a receptacle and over the top thereof. Slings 4 and 5, which are pivotally connected by a pivot 6, are pivoted to the bail arms by pivots 7 and 8. A lock 9 is provided to lock the bail arms in one or more rigid positions to make a rigid bail which cannot be detached from a receptacle except when purposely so manipulated. The lock 9 can be made in several different ways but the specific construction illustrated by the drawings is exceedingly simple and consists of a bar which is pivoted to one sling by a pivot 10 and which is provided with a hole 11 which is a little larger than a pin or bolt 12 which passes through the hole and is secured to the other sling. The lower ends of the bail arms may be formed in any suitable manner to engage with a receptacle.

The bail illustrated by the drawings is constructed from strap metal as a matter of convenience in manufacturing the same and each sling is illustrated as composed of a pair of parallel straps, while each bail arm is illustrated as composed of a single strap bent to form a loop 13 and the parallel sides are stiffened and strengthened by spacing members 14 and fastenings 15. The receptacle 16 is illustrated as provided with pintles 17 and 18 to engage in the loops 13, but the invention is not limited to the specific details of construction illustrated by the drawings. A latch 19, which is illustrated as provided with a handle 20, is pivoted to a bail arm by a pivot 21 and is adapted to engage with the receptacle 16 to prevent relative movement between the bail and the receptacle except when the latch is purposely actuated.

In order that the invention may be readily understood, the pivot 3 is shown in full lines by Fig. 1 of the drawings as above a line which may be assumed as drawn straight across from the pivot 7 to the pivot 8, and the pivot 3 is shown by dotted lines as below such a line. Any weight supported from the lower ends of the slings 4 and 5 tends to swing the lower ends of the slings together but the lower ends of the slings cannot move toward each other on account of the pin 12 engaging against the inner side of the hole 11 in the lock 9 as clearly shown by Fig. 5 of the drawings. When a receptacle is supported by the bail arms, the weight of the receptacle tends to swing the bail arms upon the pivots 7 and 8 to elevate the pivot 3 but such movement is prevented by the lock 9. To detach the bail from a receptacle the pivot 3 can be depressed to the position shown by the dotted lines in Fig. 1 of the drawings. The hole 11 permits sufficient outward movement of the pin 12 that the lower ends of the slings can move apart far enough to permit the pivot 3 to be moved from one position to another, as will be clearly understood.

The construction is in principle that of a rigid triangle, the parts of which cannot be distorted except by changing the position of the pivot 3.

The construction which includes a lock or locks for the purposes stated is the construction which I prefer for many uses as the bail arms are prevented from movements beyond certain predetermined positions, and this construction affords a preciseness of action which is of great advantage in handling standard equipment of receptacles as possible lost or waste movements on the part of operators are eliminated, but the lock can be omitted and the bail arms allowed to hang from slings without any positive lock. The bail arms and slings, under the influence of gravity, will retain substantially the positions shown by Fig. 1 of the drawings and one or both bail arms may be counterweighted as shown by Fig. 4 of the drawings to regulate the positions which the bail arms will assume under the influence of gravity alone.

The great advantage of the bail is that the hoist 23 may pull in any direction for hoisting or moving a receptacle and no such pull will detach the bail from a receptacle.

What is claimed is:

1. A bail composed of bail arms pivoted together and having their ends bent downwardly, in combination with slings connected with the bail arms at points removed from their pivotal connection, and means for preventing relative movements of the bail arms with respect to each other beyond a predetermined extent.

2. The combination in a bail of downwardly diverging slings, bail arms pivoted to the lower ends of said slings and pivoted together between said slings, and means to hold the bail arms in a predetermined position.

3. The combination in a bail of downwardly diverging slings, bail arms pivoted to the lower ends of said slings and pivoted together between said slings, and means to permit relative movement of the lower ends of the said slings.

In witness whereof I hereto affix my signature.

EDWARD G. CARR.